INVENTOR:
Meritt L. Miller;
BY
Henry J. ——
Attorney.

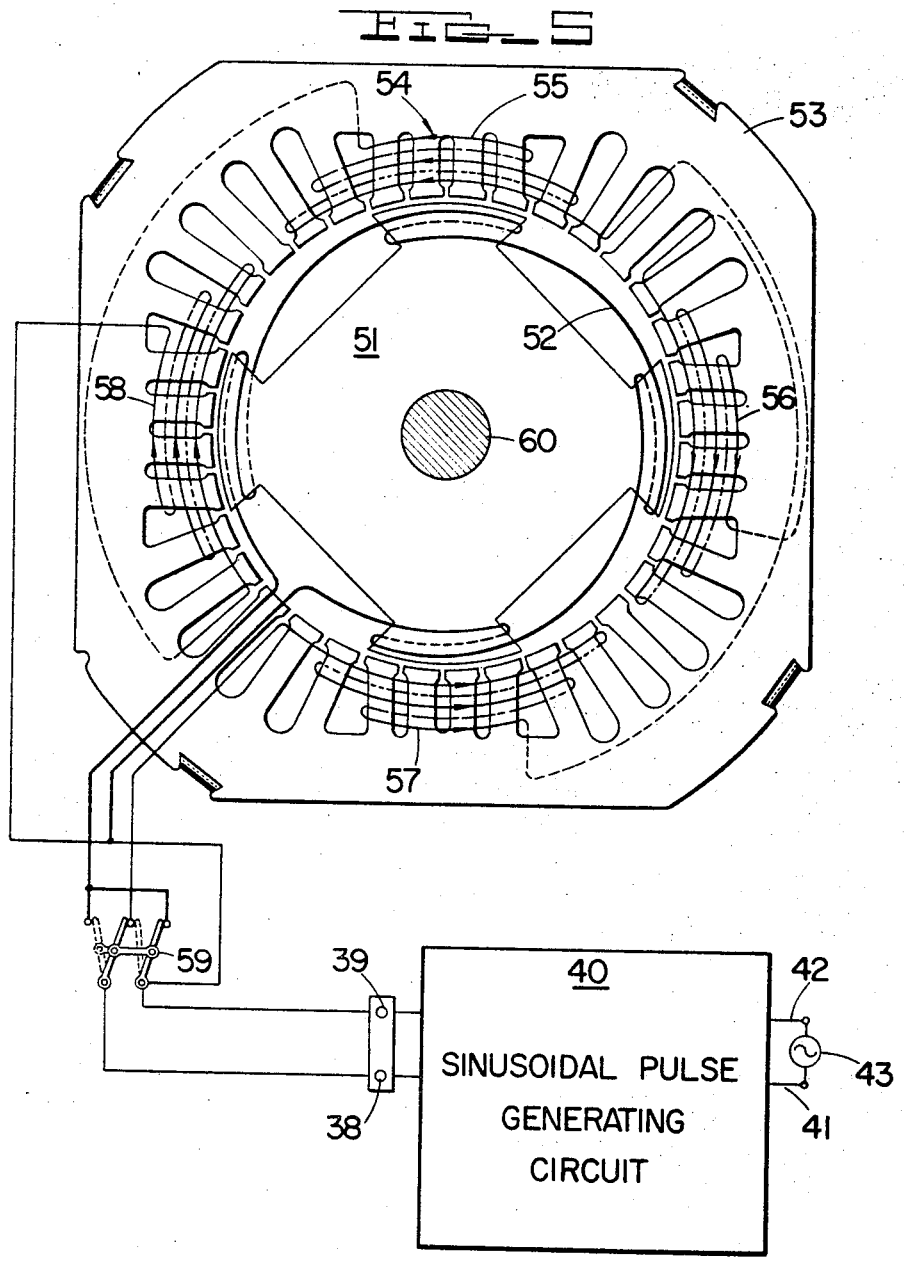

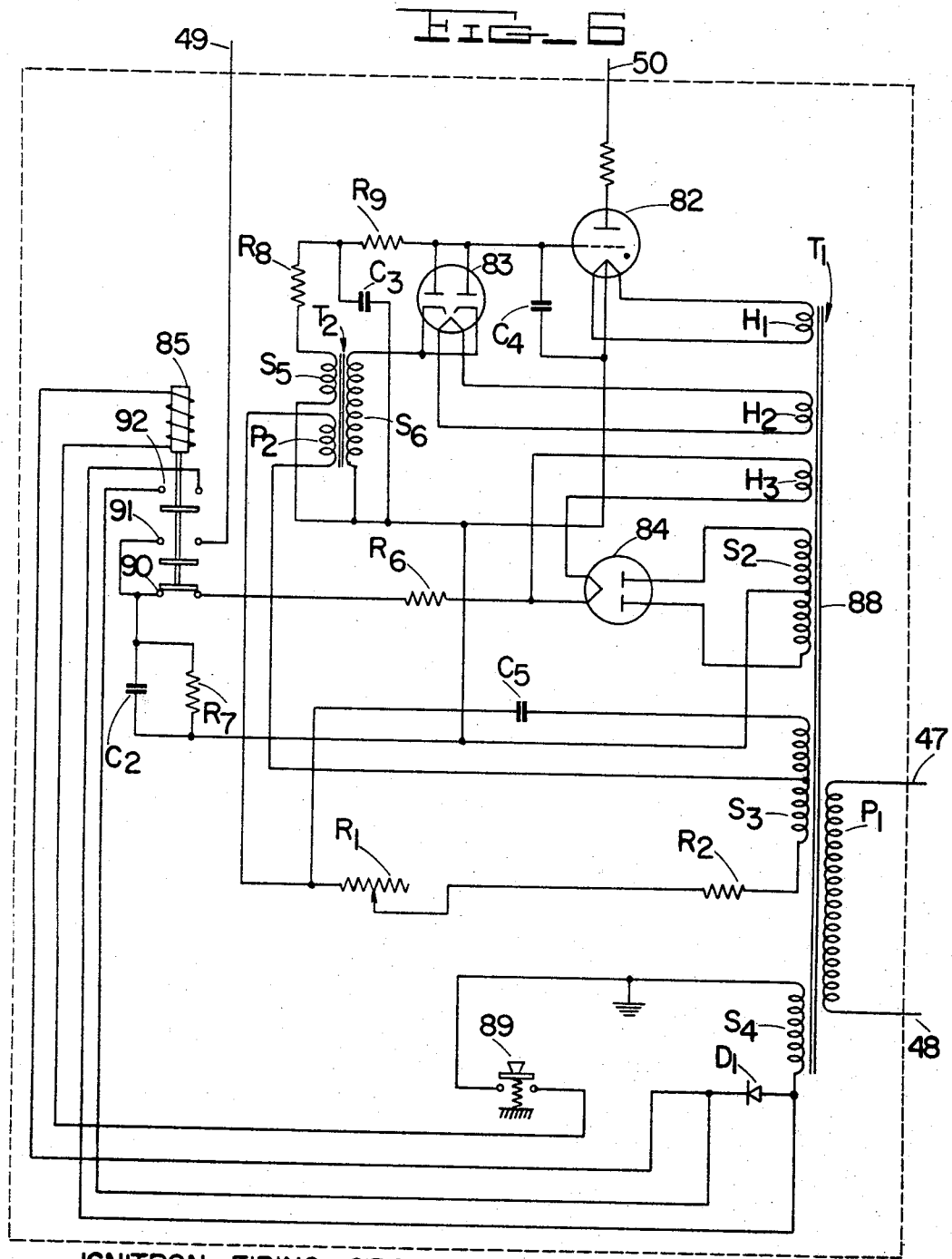

United States Patent Office 3,407,471
Patented Oct. 29, 1968

3,407,471
APPARATUS FOR CHANGING RELATIVE POSI-
TIONS OF MOVABLE CONDUCTORS OF AN
ELECTRICAL INDUCTIVE DEVICE
Meritt L. Miller, Fort Wayne, Ind., assignor to General
Electric Company, a corporation of New York
Filed July 28, 1966, Ser. No. 568,589
6 Claims. (Cl. 29—205)

Background of the invention

The present invention relates generally to an improved apparatus for changing the relative position of a number of coil conductors or portions thereof to obtain a desired spacial relationship with respect to the magnetic core of the inductive device. Particularly, the invention pertains to such apparatus as are suitable for use in the manufacture of dynamoelectric machines.

In the manufacture of dynamoelectric machines, such as small fractional horsepower motors, a number of electrical coils are inserted in the slots of a magnetic stator core. After the coils are inserted in the slots, the side portions of the coils that are disposed in the slots are packed or compacted so that the available slot space can be effectively utilized. The end turn portions of the coils, which are the portions which extend axially beyond the end faces of the stator core, generally must be pushed back toward the end faces of the stator core in order to minimize the axial dimensions of the stator core and to prevent the end turn portions from obstructing the entrance to the stator bore.

New and improved methods for effecting various coil conductor positioning operations are disclosed and claimed in United States Patent Nos. 3,333,327; 3,333,328; 3,333,-329; 3,333,330; and 3,333,335; issued Aug. 1, 1967 and assigned to the same assignee as the present application. In the commercial applications of these new and improved methods a capacitor bank is discharged to generate the electrical energy employed to perform useful work on the motor coils. The capacitor discharge results in a complex electrical transient and magnetic and mechanical forces are generated to push the conductors to the bottom of the slot and the end turns toward the end faces of the stator core.

Although these improved methods utilizing capacitor discharge circuits have been preeminently successful in practice, the capacitor discharge circuits are relatively complex, expensive and charge the capacitor bank to relatively high voltage levels. Even though the cost of coil-transforming equipment utilizing capacitor discharge circuitry is less expensive than equipment utilizing mechanical devices to effect desired coil-transforming operations on a coil, it is desirable, of course, to achieve simplification and reductions in the cost of such apparatus and to minimize any high voltage hazard to operating personnel.

Summary of the invention

Accordingly, it is a general object of my invention to provide an improved apparatus for carrying out coil-transforming operations on coils of inductive devices or portions of such coils.

It is another more specific object of the present invention to provide an improved apparatus including circuitry for effecting coil-transforming operations that do not require the use of relatively high voltages.

Another more specific object of the present invention is to provide an improved apparatus for effecting a desired placement of an electrical coil with respect to a magnetic core that does not require the use of a capacitor discharge circuit.

It is still a further object of the present invention to provide an improved apparatus for effecting various coil-transforming operations, such as compacting the side portions and end turn portions of a coil that utilizes a relatively simple circuit arrangement and that is easy to maintain and reliable in operation.

As briefly stated, in accordance with one form of the present invention, I provide an improved apparatus for effecting a coil-transforming operation on at least a part of a coil carried on a core member of ferromagnetic material. The apparatus is provided with a work station for supporting the core member, by way of exemplification, a stator core, and for effecting the coil-transforming operation on at least a portion of the coil. The apparatus also includes a sinusoidal pulse supply means for supplying a sinusoidal from an alternating current source under an essentially short circuit condition for a preselected interval to effect the desired coil transforming operation. To further aid in effecting the coil-transforming operation, means for coupling the coil with the sinusoidal pulse supply means is furnished at the work station which in one form may include an auxiliary winding coupled with the coil in the load circuit, and the sinusoidal pulse from the sinusoidal pulse supply means is applied to the auxiliary winding to induce a current flow in the coil.

In another form, the coupling means may include a member formed of diamagnetic material that may be placed in the vicinity of the coil in the load circuit whereby the current flow in the coil induces a transient eddy current flow in said member to create flux to aid in effecting the desired coil transforming operation.

The subject matter which I regard as my invention is particularly pointed out and distinctly claimed in the concluding portion of the specification. My invention, however, both as to organization and method of operation, together with further objects and advantages thereof, may be best understood by reference to the following description taken in conjunction with the accompanying drawings.

Brief description of the drawings

FIGURE 5 illustrates an end view of a dynamoelectric machine stator core and auxiliary winding member connected to a sinusoidal pulse generating circuit; and FIGURE 6 is a schematic diagram of the ignitron firing circuit shown in block diagram in FIGURE 1.

Description of the preferred embodiments

Figure 1:
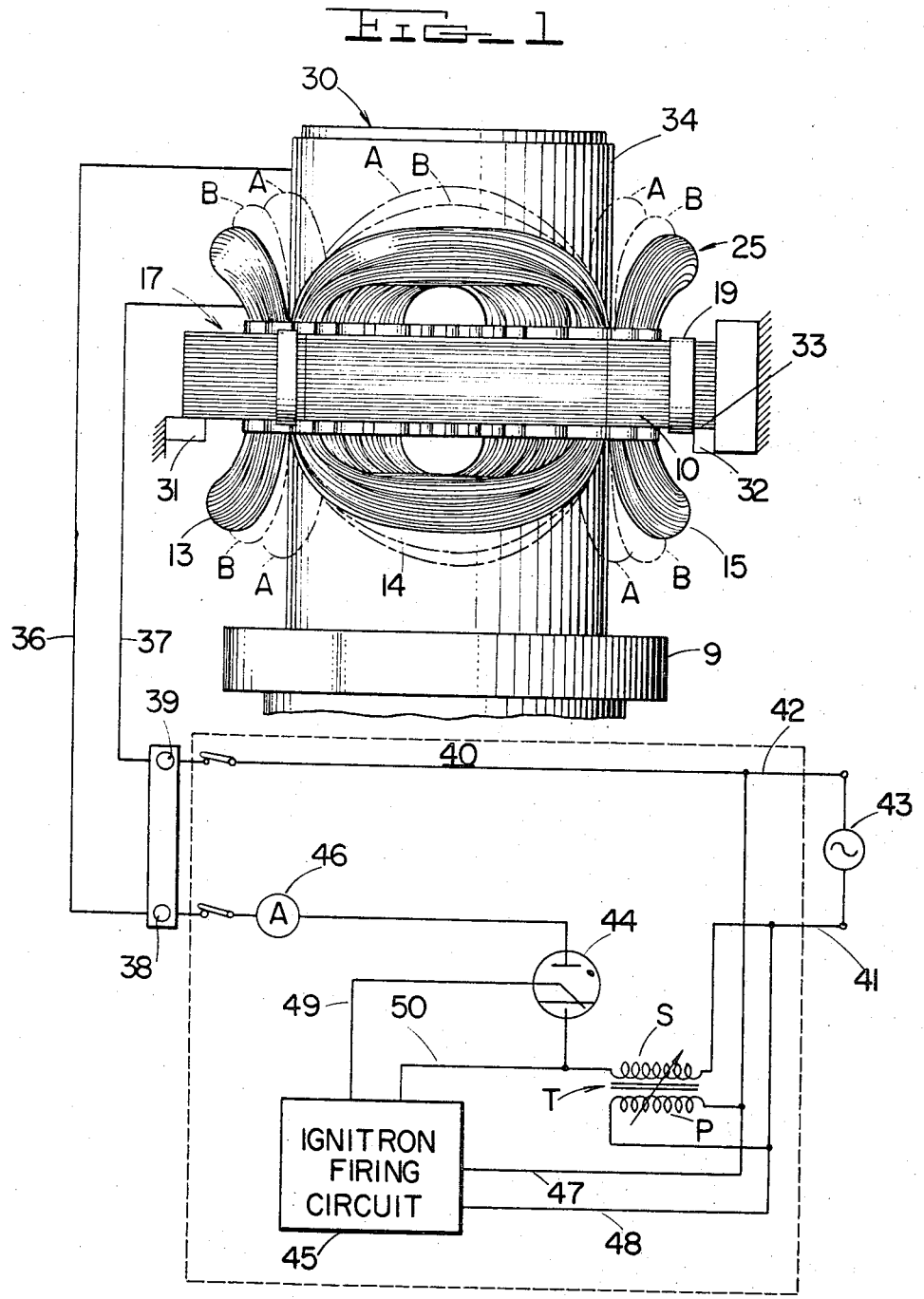
FIGURE 1 is a side elevational view of a dynamoelectric machine stator core with the coils of the main winding shown after insertion and with the coil placing operation having been carried out in accordance with one form of the invention, the coils also being shown connected to a sinusoidal pulse generating circuit shown schematically with the ignitron firing circuit being shown in a block diagram form.
Figure 2:
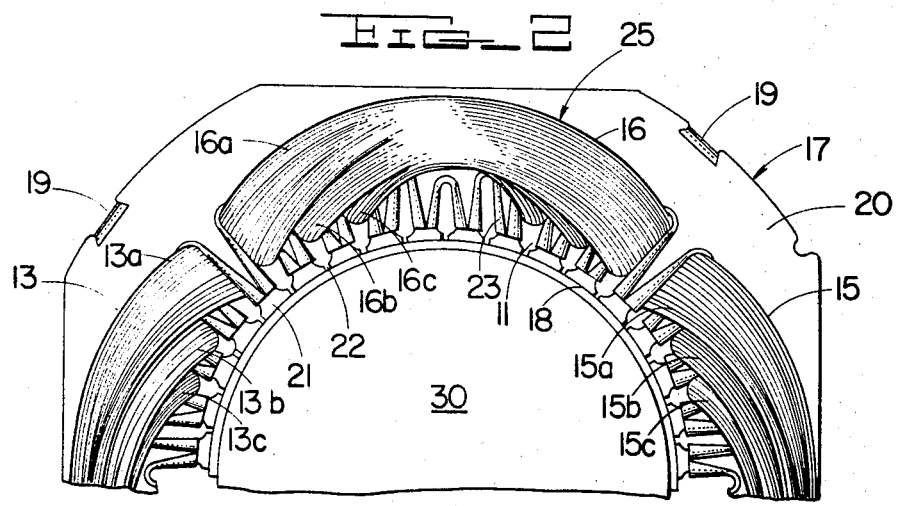
FIGURE 2 is an enlarged fragmentary plan view of the dynamoelectric machine stator core and apparatus of FIGURE 1.
Figure 3:
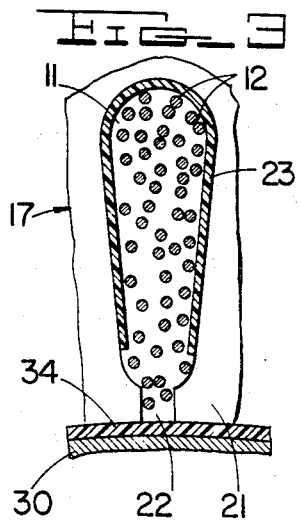
FIGURE 3 is an enlarged fragmentary view of one of the coil accommodating slots of the dynamoelectric machine stator core shown in FIGURES 1 and 2, illustrating the distribution of the individual conductors after insertion of the coils into the slot during the process of manufacture.
Figure 4:
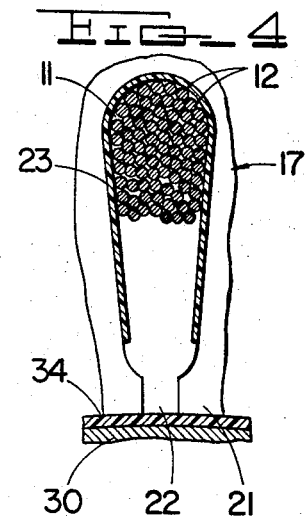
FIGURE 4 is an enlarged fragmentary view of a coil accommodating slot corresponding to the view shown in FIGURE 3 and illustrating a coil-transforming operation accomplished with one form of the improved apparatus embodying the present invention.

Referring now to the drawings in more detail and, in particular, to FIGURES 1–4 inclusive, I have illustrated therein, for the purposes of explaining one aspect of my invention, the improved apparatus as applied to a fourpole stator core 10 of a dynamoelectric machine. It will be understood that initially the coils are placed or inserted in the slots 11 and the coils are comprised of a predetermined number of loosely distributed turns 12. As shown in FIGURE 1, an initial position A of the coils of coil groups 13, 14, 15 and an intermediate position B are revealed in dashed outline. In the initial position A, the coil groups 13, 14, 15 would obstruct the entrance to the bore 18 of stator core 17. It will be apparent, therefore, that certain coil transforming operations are required, if not necessary, to press back the end turns of the coil groups 13, 14, 15 so that they do not obstruct the bore 18. Further, to more effectively utilize the slot space, the individual turns 12 (see FIGURE 3) must be compacted toward the bottom slot wall as shown in FIGURE 4.

The stator core 17 is comprised of a plurality of laminations stamped from relatively thin ferromagnetic sheet material held together in stacked relation by any suitable means such as a key arrangement extending across the lamination stack and generally identified by a reference numeral 19. The stator core 17 includes a yoke section 20 and a plurality of angularly spaced apart tooth sections 21 which project radially inward from the yoke section 20 and define angularly spaced apart, open ended slots, each slot communicating with the bore 18 through a restricted slot entrance 22. In each slot 11 a generally U-shaped slot liner 23 is provided to insulate the coils from the stator core 17. The main field winding 25 used in the exemplification of my invention is of the distributed type and is comprised of four identical coil groups 13, 14, 15 and 16. Each coil group is formed by three serially connected concentric coils symmetrically disposed about a polar radial center, the coils of coil groups 13, 15 and 16 in FIGURE 2 being identified by the reference numerals and letters, 13a, 13b, 13c, 15a, 15b, 15c, 16a, 16b, and 16c respectively.

Having more specific reference now to FIGURE 1, I will now more specifically describe the improved apparatus for effecting the desired placement of the coil or a part thereof relative to the dynamoelectric machine core 17. In applying my invention to this dynamoelectric machine core, initially the dynamoelectric machine stator core was placed over a rigid fixture member 30 of diamagnetic material, such as copper or aluminum, the fixture member 30 being attached to a table 9. The fixture member 30 is cylindrical in shape and extends through the bore 18 of stator core 17, the stator core 17 being held by the support members 31, 32 with the flat side 33 of the stator core 17 (see FIGURE 1) engaging an adjacent flat side on support member 32 so that any rotation of the stator core 17 is prevented when it is positioned as shown.

In order to prevent a possible arcing between the turns of the coils near the slot openings, the cylindrical fixture 30 preferably includes an insulating sleeve 34 of pressed fiber or other suitable material. This insulating sleeve 34 may be an integral part of the fixture 30 or the sleeve 34 may be inserted into the bore 18, after the coil insertion operation as a means for retaining the turns in the slots 11 so as to prevent the turns from sliding into the bore 18 of the core 17 as the core 17 is being handled during the process of manufacture. When this procedure is followed, the assembly consisting of the insulating sleeve 34 and the stator core 17 can be placed on the fixture 30 and support members 31, 32 at the work station where the coil transforming operations are to be carried out.

As I have shown in FIGURE 1, leads 36, 37 of the main winding 25 are connected to the output terminals 38, 39 of a sinusoidal pulse generating circuit 40. It will be seen that the input leads 41, 42 of the sinusoidal pulse generating circuit 40 are connected to an alternating current source 43, such as a commercial 440 volt alternating supply. Thus, when ignitron 44 is switched on, the sum of the source voltage and the voltage across the secondary winding S of variable transformer T is applied to the main winding 25 connected across terminals 38 and 39. The ignitron firing circuit 45, as will hereinafter be more fully described, is adjusted to switch on ignitron 44 at a predetermined point in a half cycle of the alternating current supply to apply a portion or a number of sinusoidal pulses from the alternating current source under essentially the short circuit condition. The primary winding P and the ignitron firing circuit 45 is energized from the alternating source 43 by leads 47, 48 which, as schematically shown are joined with the input leads 41, 42 of the pulse generating circuit 40. Leads 49 and 50 couple the ignitron firing circuit 45 with the starter rod and cathode of ignitron 44.

The source of alternating current into which the pulse generating circuit 40 is connected should be capable of supplying the required short circuit current. In the exemplification of the invention, the pulse generating circuit 40 was fused to handle 4,000 amperes for 10 or 20 milliseconds. In order to obtain readings of the current flow through the winding 25, an ammeter 46 was connected in series with the ignitron 44.

In order to provide a further control of the current, the secondary winding S of variable transformer T was connected in series with the alternating current source to selectively introduce a bucking or boosting voltage in the circuit thereby to decrease or increase the net voltage applied across winding 25. It will be appreciated that the magnitude of current and the duration of the pulse to be supplied to the coils to effect a desired coil-transforming operation are dependent upon many factors such as the conductor turn size, the conductor material, the final coil configuration desired, the initial relative positions of the turns with respect to each other, the configuration of the nonmagnetic fixture, and other factors. In the actual practice of my invention, the current and pulse duration was determined by trying pulses of varying magnitudes and duration and selecting the combination that would accomplish the desired coil-transforming operation.

It was found that when a sinusoidal pulse or portion of a pulse is supplied to the coils of winding 25 under short circuit conditions (the stator winding 25 having relatively little resistance essentially presents a short circuit condition when connected across the power supply and secondary winding S of transformer T), a varying magnetic field is established by the current flow in the winding 25. The intensity of this magnetic field is greater in the region of the ends of the tooth section 21 of the stator core 17 as compared with the magnetic field in the yoke section 20. The eddy currents induced in the auxiliary fixture 30 create a magnetic field that increases the intensity of the magnetic field in the region of the extremities of the tooth section 21. As a result, the conductors or turns 12 are forced back toward the bottom of the slots 11 to the position shown in FIGURE 4. Also, as a result of interaction of the resulting magnetic fields, the end turn portions are pushed back from position A shown in dashed outline in FIGURE 1 to the position as shown in the drawings.

From the foregoing description of my improved apparatus, it will be appreciated that the transformation of the conductor turns of a coil into a desired configuration can be readily and economically achieved. Further, the coil-transforming operations required in the manufacture of dynamoelectric machine cores can be achieved without the employment of relatively high voltages which present a hazard to operating personnel. Moreover, these advantages are obtained without adversely affecting the electrical characteristics of the coil.

Having specific reference now to FIGURE 5, I will now describe more fully the second embodiment of the present invention wherein a fixture 51 with an auxiliary winding 52, shown schematically, is utilized. The auxiliary winding fixture 51 is positioned within a stator core. The stator winding 54, which is also shown schematically, comprises four coil groups 55, 56, 57 and 58, each of which spans 4, 6, and 8 teeth sections respectively of the stator core 53.

In this exemplification of the invention, a portion of a sinusoidal pulse or a number of sinusoidal pulses may be selectively applied to one of the windings and a current flow induced in the other winding by transformer action. For the position of switch 59, as shown in FIGURE 5, the sinusoidal pulse from the pulse generating circuit is supplied under an essentially short circuit condition to the stator winding 54 and a current flow is induced in the auxiliary winding 52, a closed path being provided for this induced current flow. When switch 59 is moved to the position shown in a dashed outline, it will be seen that auxiliary winding 52 is now connected across the output terminals 38, 39 of the sinusoidal pulse generating circuit 40 and the stator winding is short circuited. In view of the inductive coupling between the two windings 52, 54, the auxiliary winding 52 will in effect function as the primary winding of a transformer and cause current flow to be induced in the stator winding 54. Also to prevent relative movement between the stator core 53 and fixture 51, any rotational movement of both of these parts must be constrained. The support shaft 60 of fixture 51 is rigidly supported to prevent rotational movement. Rotational movement of stator core 53 may be restrained by the use of a support member 32 as shown in FIGURE 1.

As a result of the interaction of the currents in the magnetic field produced by the sinusoidal pulse, electromagnetic forces are caused to act on the turns of the coil groups 55, 56, 57 and 58 to push back the portions of the turns in the slots toward the bottom of the slots. Also, a pushback of the coil end turn portions is achieved. Although in the exemplification of the invention illustrated in FIGURE 5, only one of the windings 52, 53 in the load circuit is directly energized from the sinusoidal pulse generating circuit, it will be appreciated that these windings can be simultaneously energized in the load circuit with a portion of a sinusoidal pulse or a number of sinusoidal pulses. Also, although the coil groups 55, 56, 57 and 58 of auxiliary winding 52 are connected in series as shown schematically in FIGURE 5, it will be readily apparent to those skilled in the art that these coil groups can also be connected in parallel.

Turning now to FIGURE 6, I will now more fully describe the ignitron firing circuit 45 shown as block diagram in the simplified schematic circuit of FIGURE 1. The ignitron firing circuit 45 controls the firing point at which the ignitron 44 is triggered into conduction to pass a number of sinusoidal half cycles or a portion of a sinusoidal half cycle from the alternating current source 43. The ignitron firing circuit 41 is coupled with the starter rod and cathode of the ignitron 44 by means of leads 49 and 50.

In the exemplification of the invention, a variable resistor $R_1$ and $R_2$ of a phase shift circuit provided control of the firing point of ignitron 44 to produce a sinusoidal pulse of any one portion of a half cycle ranging from approximately 20–100% of the half cycle. Further control was provided over the amount of power supplied at the output terminals 38 and 39 under short circuit conditions by adjusting the variable transformer T (see FIGURE 1) to provide a bucking or a boosting voltage in series with the source voltage.

The ignitron firing circuit includes a thryratron 82, a twin diode 83, and a twin diode 84. The thyratron 82 is controlled by relay 85, a transformer $T_2$ having a primary winding $P_2$ and secondary windings $S_5$, $S_6$, and a phase shift circuit including a capacitor $C_5$ and a variable resistor $R_1$. A full wave rectifier comprising a center tap secondary winding $S_2$ and the twin diode 84 supplies the charging current for firing capacitor $C_2$ through resistor $R_6$. A bleeder resistor $R_7$ is connected across the firing capacitor $C_2$.

A transformer $T_1$ having a primary winding $P_1$ coupled with the alternating current source supplies the power for various components of the ignitron firing circuit. The secondary windings $H_1$, $H_2$, $H_3$ respectively provide current for the heaters of the thyratron 82, and twin diodes 83 and 84. It will be seen that the primary winding $P_2$ is energized by the portion of the secondary winding $S_3$ inductively coupled with the primary winding $P_1$ on magnetic core 88 of transformer $T_1$. Also inductively coupled on magnetic core 88 is a secondary winding $S_4$ which energizes the relay actuating circuit. When the start switch 89 is closed, relay 85 is energized to thereby open the normally closed contacts 90 and close the normally open contacts 91 and 92. With relay contacts 91 closed, it will be seen that the firing capacitor $C_2$ is now connected in electrical circuit with the lead 49 which is joined to the starter rod of the ignitron 44. The ignitron will be triggered into conduction when its cathode is rendered negative by switching on the thyratron 82.

The twin diode 83 maintains a relatively small negative bias on the grid of thyratron 82 by charging capacitors $C_3$ and $C_4$. Once every positive half cycle, the voltage supplied by the secondary winding $S_5$ of transformer $T_2$ causes the grid voltage of thyratron 82 to momentarily go positive so that it can fire. If relay 85 is actuated to close contacts 91 so that there is a positive anode supply for the thyratron 82, the thyratron 82 will cause the capacitor $C_2$ to discharge through the starter rod of the ignitron 44. This discharge time constant is such that the capacitor $C_2$ will be almost completely discharged in less than one cycle.

The phase of the voltage supplied to its primary winding $P_2$ of transformer $T_2$ is adjusted with the rheostat on variable resistor $R_1$. Thus, the instant at which thyratron 82 is fired can be adjusted with respect to the voltage applied at the anode of the ignitron 44, and the portion of a sinusoidal pulse or a number of sinusoidal pulses can be supplied at the terminals 38, 39 of the pulse generating circuit 40.

From the foregoing discussion of the apparatus exemplifying my invention, it will be apparent that various coil-transforming operations on magnetic core members, by way of illustration dynamoelectric machine cores, can be economically accomplished without need for complex circuits, such as capacitor discharge circuits, that require the use of relatively high voltages. Also, the improved apparatus is relatively compact and inexpensive to manufacture.

While I have shown and described various embodiments of the invention, it will be obvious to those skilled in the art that changes and modifications may be made without departing from the invention. It is therefore intended in the appended claims to cover all such changes and modifications that fall within the true spirit and scope of my invention.

What I claim as new and desire to secure by Letters Patent of the United States is:

1. An apparatus for effecting a desired coil-transforming of an electrical coil or part thereof relative to a dynamoelectric machine core formed of ferromagnetic material, said dynamoelectric machine core having a bore and a number of spaced apart tooth sections defining a plurality of axially extending slots, each coil being comprised of individually movable turns of insulated wire conductor and having a pair of spaced apart side portions accommodated in preselected pairs of slots, said apparatus comprising: a work station for supporting said dynamoelectric machine core in a load circuit and for effecting the coil transforming operation on at least a portion of said coil, a sinusoidal pulse supply means for supplying at least a portion of a sinusoidal pulse from an alternating current source to said load circuit under an essentially short circuit condition for a preselected interval, and means for coupling said at least one coil of said dynamoelectric machine core with said sinusoidal pulse supply means for generating in said coil a current flow to effect said coil transforming operation on at least said portion of the coil.

2. The apparatus set forth in claim 1 wherein said means for coupling includes an auxiliary winding inductively coupled with said coil in the load circuit, said at least a portion of a sinusoidal pulse from said sinusoidal pulse supply means being applied to said auxiliary winding, said current flow in said coil being induced therein by transformer action.

3. The apparatus set forth in claim 1 wherein said sinusoidal pulse supply means includes the variable transformer for selectively providing a bucking or boosting voltage relative to the voltage of the alternating current source.

4. An apparatus for effecting a coil-transforming operation on at least a part of a coil carried on a core member of a ferromagnetic material, said apparatus comprising: a work station for placing the coil carrying core member in a load circuit for energization from an alternating current source, sinusoidal pulse supply means for selectively supplying to the load circuit at least a portion of a sinusoidal pulse from the alternating current source under an essentially short circuit condition, and means coupling said coil with said sinusoidal pulse supply means for generating in said coil a preselected magnitude of transient current flow therein to effect the desired coil-transforming operation.

5. The apparatus set forth in claim 4 wherein an auxiliary winding is disposed in transformer relationship with respect to said coil and said at least a portion of a sinusoidal pulse of an alternating current source is applied to said auxiliary winding, said coil providing a closed low resistance path for said current flow induced therein.

6. The apparatus set forth in claim 4 wherein said sinusoidal pulse supply means includes a transformer supplying a selectively variable voltage in bucking or boosting relationship with respect to the voltage of the alternating current source.

References Cited

UNITED STATES PATENTS

| | | | |
|---|---|---|---|
| 3,333,327 | 8/1967 | Larsen | 29—596 |
| 3,333,328 | 8/1967 | Rushing | 29—596 |
| 3,333,329 | 8/1967 | Linkous | 29—596 |
| 3,333,330 | 8/1967 | Linkous | 29—596 |
| 3,333,335 | 8/1967 | Sims | 29—596 X |
| 3,348,183 | 10/1967 | Hodges et al. | |
| 3,353,251 | 11/1967 | Linkous | 29—205 |

JOHN F. CAMPBELL, *Primary Examiner.*

J. CLINE, *Assistant Examiner.*